May 22, 1951 M. R. WARREN 2,554,433
BLOCK HANDLING MACHINE
Filed July 19, 1945 3 Sheets-Sheet 1

Inventor:
Millard R. Warren
By Albert H. Kirchner
Attorney

May 22, 1951  M. R. WARREN  2,554,433
BLOCK HANDLING MACHINE
Filed July 19, 1945   3 Sheets-Sheet 2
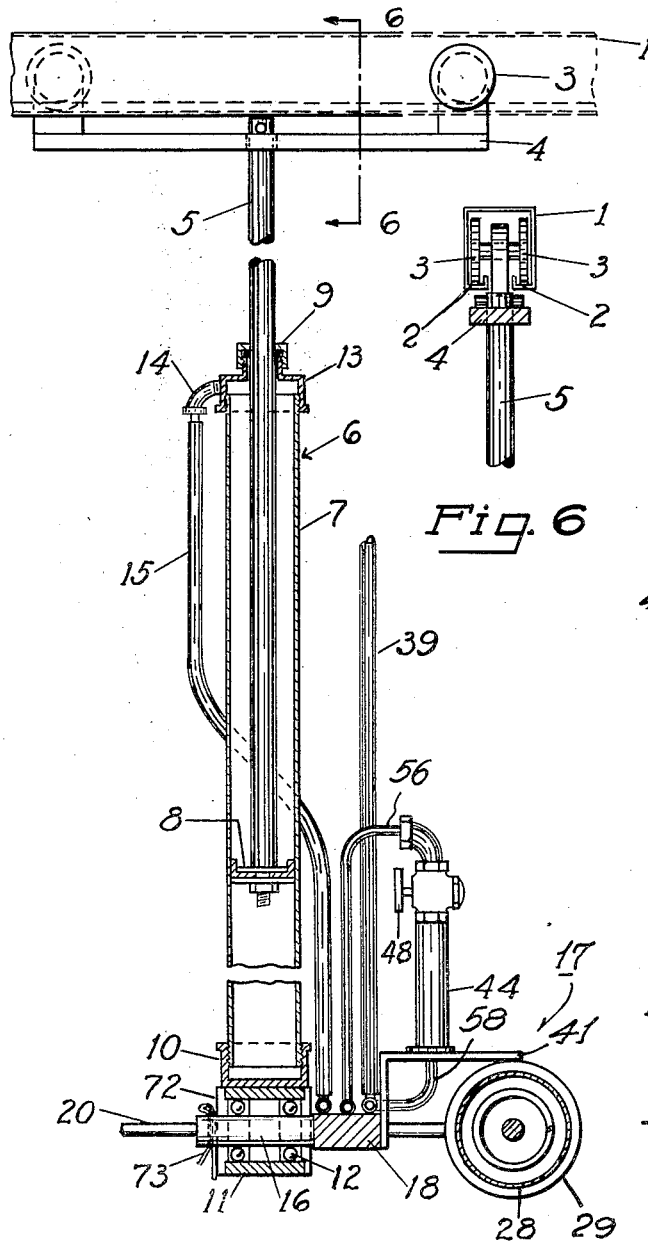
Fig. 3
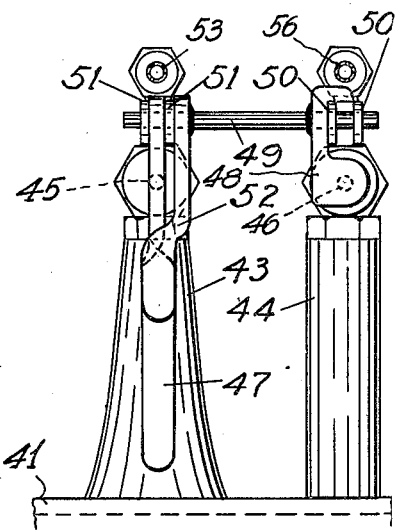
Fig. 6
Fig. 4
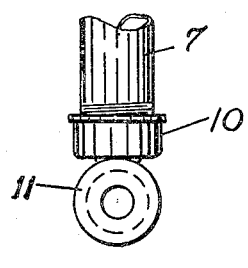
Fig. 5
Inventor:
Millard R. Warren
By Albert H. Kirchner
Attorney Patented May 22, 1951

2,554,433

UNITED STATES PATENT OFFICE 2,554,433

BLOCK HANDLING MACHINE

Millard R. Warren, Knoxville, Tenn.

Application July 19, 1945, Serial No. 605,932

9 Claims. (Cl. 294—106)

The present invention relates to material handling devices and more particularly to machines for elevating and lowering and moving laterally over relatively short distances building blocks, tile, brick and the like.

A principal object of the invention is to provide a machine of the class indicated which will be useful in removing concrete blocks and analogous building units from the mold pallets to a stockpile, and which can be used in stacking such units, as in removing them from one pile to another, between a pile and a truck or other vehicle, etc.

Objects of the invention include providing a machine of the class indicated which will effect considerable saving in labor by handling simultaneously and expeditiously a plurality of units which are too heavy and too bulky for a man to lift, which will be power operated and subject to constant and ready control by an operator, which will be simple and inexpensive to manufacture and operate and which will be foolproof in use and rugged and durable in construction.

A very important object of the invention is to provide a device which can be used to remove newly formed blocks from their positions on a series of pallets which are racked one above the other for supporting the blocks in a curing kiln and to move the blocks to a stockpile or on to a truck or the like where they are to be stacked. This operation has heretofore required hand labor to reach in between the pallets, which are vertically spaced in the rack, to grasp one block at a time, or a very few blocks at a time, lift them slightly from their pallets, and then withdraw them horizontally. Any mechanical or power means for performing this operation must be equipped with a clamping or grappling device capable of fitting into the spaces between the superposed pallets, where the blocks have very little head room, and the device must be capable of elevating the blocks just enough to clear the pallets. Then it is necessary for the device to be operable to withdraw the blocks from between the pallets, while holding the blocks securely, and to elevate or lower and move the blocks horizontally some considerable distance to the place where they are to be released and deposited.

Such a device, in addition to having physical structure adapting it to fit into the low and narrow spaces where it must operate, must also have control means for governing its clamping, releasing, elevating and lowering movements which can be actuated readily and sensitively by the operator so that all the movements are accurately controlled. Important objects of the invention are therefore concerned with providing a machine which will satisfy all the foregoing requirements.

Another requisite of such a machine is that it be capable of swinging or otherwise translating the load from one location to another. Such movements are additional to the clamping, releasing, elevating and lowering movements, and all of them must be constantly under the ready and easy control of an operator. Accordingly, an object of the invention is to provide for all these varied movements a control means which can be actuated readily, easily and accurately by an operator without requiring the operator to change his hold on the control means. In the preferred embodiment of the invention this is accomplished by providing for the operator a plurality of valve means mounted on that part of the machine which he holds to push or pull the load horizontally, so that without moving his hands or changing their position on the machine he can push or pull the load about and can clamp, release, elevate and lower it.

With the foregoing and other objects and advantages in view, the invention consists in the structure defined in the appended claims, illustrated in the accompanying drawings and described in the present specification, which drawings and specification disclose an embodiment of the invention which has been fully tested in practical use and which has given satisfactory service and is therefore at present preferred by me. It is understood that the principles of the invention are capable of being embodied in other and further modified forms all within the spirit of the invention as defined by the claims.

In the drawings,

Fig. 3 is a vertical sectional view taken centrally through the combined clamping and hoisting devices;

Fig. 4 is a detail elevational view of two of the valves;

Fig. 5 is a detail elevational view of the lower end portion of the hoisting device;

Fig. 6 is a cross sectional view taken along the line 6—6 of Fig. 3 showing the cooperation of the hoisting device carriage and its trackway in the boom.

Figure 1:
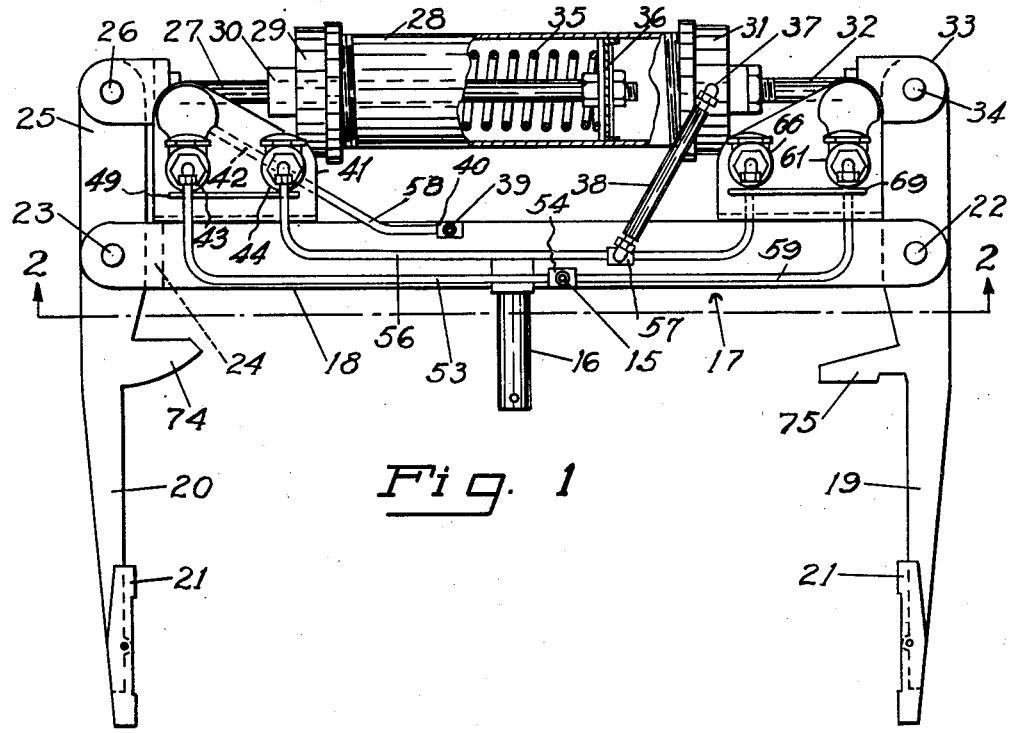
Fig. 1 is a plan view of the clamping portion of the machine.

The invention comprises, generally speaking, the combination of a hoisting device and a clamping device, both supported from a carriage which is movable lengthwise along the substantially horizontal boom of a stationary or portable tower. Fluid pressure means is provided for raising and lowering the hoisting elements and for operating the clamping device to grip or release a load, which consists usually of a plurality of units, as indicated in Figs. 7–10. Operating valves are provided on the clamping device for controlling its gripping and releasing movements and for controlling the elevating and lowering movements of the hoisting device. The clamping device is made rotatable with relation to the hoisting device so that a load of units may be picked up in horizontal or vertical position and set down after being turned to vertical or horizontal position.

Referring now to the drawings, and first to Fig. 3, the reference numeral 1 designates the horizontally disposed boom of a vertical tower (not shown) of the conventional type employed in material handling machines. This boom is formed to provide trackways 2 for the four wheels 3 of a carriage 4 from the center of which depends the piston rod 5 of the hoisting device 6 of the machine. The carriage 4 may be made in any convenient way so as to include some lengthwise means or member to which the piston rod 5 is rigidly secured or jointed so as to depend in substantially vertical position.

The hoisting device 6 includes a barrel or cylinder 7 containing a piston 8 carried by the rod 5. The upper end of the barrel 7 is packed around the piston rod by any suitable type of gland 9, and the lower end of the barrel has threaded to it a cap 10 carrying an enlarged eye or socket 11 best provided with ball bearing races 12 for antifrictionally receiving the pivot pin of the clamping device hereinafter to be described.

The upper end of the barrel 7 is capped at 13, beneath the gland 9, and the cap is provided with a fluid pressure inlet and outlet nipple, shown as an L designated 14 to which is connected a flexible fluid pressure line 15.

It will be evident that with the rod 5 fixed against vertical movement with relation to the carriage 4, fluid pressure admitted to the barrel through the line 15 will raise or lower the barrel and its pivot bearing 11.

Figure 2:
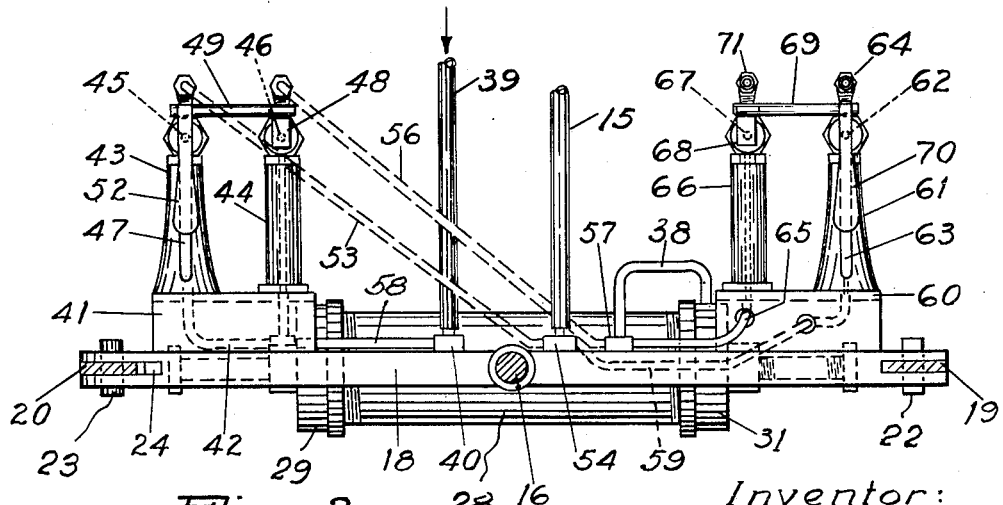
Fig. 2 is a section taken along the line 2—2 of Fig. 1 showing most of the parts of the clamping device in rear elevation and for clarity of illustration depicting some of the fluid pressure lines displaced from their actual positions, properly shown in Figs. 1 and 3.

The pivot bearing 11 receives the pivot pin 16 of a clamping device generally designated 17 and best shown in Figs. 1 and 2. This clamping device includes a bed or frame 18 which may be considered as normally horizontally disposed and from the central rear portion of which the pivot pin 16 rigidly projects. The frame 18 may be made in the form of a metal plate or bar on the ends of which are mounted clamping arms or jaws 19, 20. Either or both of these arms are pivoted to the frame member 18, so that they may be expanded or contracted relatively to each other to cause their rear ends, which are provided with pivoted shoes 21, to grip or release a load consisting of one or more building blocks or the like, as indicated in Figs. 7–10, which show a variety of different shoes mounted on a clamping jaw 19.

In practice I have found that it is sufficient to pivot one of the clamping jaws and position the other rigidly with relation to the frame 18, since it is only necessary that one of the jaws move relatively to the other to effect movements which will grip and release the load. In the illustrated embodiment of the invention the jaw 19 is shown more or less rigidly fixed to the frame 18 by the pin 22, while the jaw 20 is pivoted to the other end of the frame by the pin 23 which extends through a deepened slot 24 cut endwise into the frame 18. The pin 23 serves as a fulcrum for the jaw 20 about which it turns in response to lateral pressure or tension applied to its rear portion 25, which is connected by a pivot pin 26 to the piston rod 27 of a fluid pressure cylinder 28 which is fixed at the front of the frame 18, all as best shown in Fig. 1. The cylinder 28 is provided with a cap 29 having a packed gland 30 through which the rod 27 passes, and the opposite or head end of the cylinder is closed by a cap 31 which is connected by a short rod 32 to a clevis 33 which is pinned at 34 to the front end of the clamping jaw 19. A coil spring 35 is seated in the cylinder 28 under compression between the cap 29 and a piston 36 mounted on the inner end of the rod 27, so that the piston is urged toward the cap 31 at the head end of the cylinder to move the rod 27 to the right in Fig. 1 and thereby swing the jaw 20 around its fulcrum 23 to expand the shoes 21 and release any interposed load. This tension of the spring 35 can be overcome, and the piston moved to the left in Fig. 1, to swing the jaws and shoes toward each other by fluid pressure in the head of the cylinder. The cap 31 is provided with a fitting 37 to which is connected a fluid pressure line 38 for conducting fluid under pressure into the head and for releasing it therefrom.

It will be evident from the foregoing that the clamping jaws 19, 20 and their shoes 21, can be caused to grip or release a load of building units or the like by controlling admission and discharge of fluid under pressure through the line 38. It has been seen from the description of the hoisting device hereinabove that fluid pressure admitted and released through the line 15 will cause the bed or frame 18 and the load carried by it to be elevated or lowered. An important object of the invention is to provide for the ready manipulation and control of these operating pressures, and the means for effecting this control will now be described.

In a preferred embodiment of the invention, compressed air is used as the operating fluid. A source of air under pressure is not shown in the drawings but is assumed to be supplied through a flexible line 39 which is conveniently hung from the carriage 4 and is connected to a fitting 40 secured on the bed 18 of the clamping device 17. From this fitting a line 50 leads beneath a low shelf 41 secured to the left hand side of the frame 18 as seen in Figs. 1 and 2, where a manifold 42 receives air from the line 50 and supplies it to a hoisting valve 43 and a clamping valve 44 mounted on the shelf in generally upright position. Each of these valves is conventional and includes a plunger, designated 45 in the case of the hoisting valve 43 and designated 46 in the case of the clamping valve 44, each projecting from the rear side of its valve. Both plungers are normally biased to close the valves, but they are adapted to open the valves when pushed inwardly. A long trigger 47 is associated with the plunger 45 so that when this trigger is pressed toward the valve the plunger 45 will be pushed in and the valve opened. The plunger 46 is pushed in to open the valve 44 by movement of a short arm 48 projecting from a rock shaft 49 journalled for rotation in brackets 50 secured to the top of the valve 44 and in brackets 51 secured to the top of the valve 43. A relatively short trigger 52 is fixed to the shaft 49 and overlies the longer trigger 47 at sufficient spacing from it so that an operator grasping the barrel of the valve 43 may squeeze optionally either of the triggers 47 or 52 toward the barrel of the valve 43 to open either the valve 43 or the valve 44.

A fluid pressure line 53 extends from the outlet at the top of the valve 43 to a fitting 54 mounted on the bed 18 of the clamping device 17, and the line 15 extends from this fitting up to the nipple 14 in the head of the hoisting cylinder 7. It will be evident that actuation of the long trigger 47 to open the valve 43 will supply air under pressure from the line 39 to the line 15 to elevate the cylinder 7 on the fixed rod 5 and thereby hoist the frame 18.

A line 56 is connected from the outlet at the top of the valve 44 to fitting 57 secured on the bed 18 of the clamping device. From this fitting the line 38, previously referred to, is connected through the cap 31 to the head end of the clamping cylinder 28, so that pressure on the short trigger 52 will act through the shaft 49 and arm 48 on plunger 46 to open valve 44 and supply air under pressure from the line 39 through the lines 58, 56 and 38 to push the piston rod 27 to the left in Fig. 1 and move jaw 20 about its fulcrum 23 to compress a load between the shoes 21.

A load is therefore clamped and elevated by actuation of the triggers 47 and 52 in the manner explained. The load is released and lowered by operation of other similar trigger and valve means as will now be explained.

A line 59 is connected from the fitting 54 through a low shelf 60, like the shelf 41, but located at the opposite end of the bed 18, to an exhaust valve 61, which is like the valve 43. It contains a plunger 62 which is moved to open position by a long trigger 63 to release air from the hoisting cylinder 7 through the lines 15 and 59 for discharge from the outlet 64 of the valve 61. Thus the frame 18 and its associated load are lowered.

From the fitting 57 a line 65 passes under the shelf 60 and is connected to a discharge valve 66 which is like the valve 44 and contains a plunger 67 which is moved to open position by an arm 68 fixed to a rock shaft 69 mounted like the rock shaft 49 and operated by a short trigger 70 overlying and spaced from the longer trigger 63 on the valve 61 adjacent to which the valve 66 is mounted. Thus, air under pressure in the head of clamping cylinder 28 will be released from the discharge outlet 71 of valve 66 through lines 38 and 65 when the trigger 70 is depressed, thereby allowing the spring 35 to move the rod 27 to the right in Fig. 1 so as to release a load gripped between the shoes 21.

In using the machine, an operator stands in front of the clamping cylinder 28, at the top of Fig. 1, with the bodies of the valves 43 and 61 grasped in his two hands. He walks with the device thus held to the location of a group of units to be handled, swinging the boom 1 about the axis of the tower on which it is mounted and moving the carriage 4 along the boom until the desired location is reached. Then one or the other or both of the long triggers 47 and 63 are pressed to bring the jaws 19, 20 to the level of the group of units which are to be handled. The short trigger 70 is then pressed to open the jaws about the units; whereupon the short trigger 52 is pressed to clamp the jaws against the units. The operator then presses the long trigger 47 to elevate the clamping device enough to lift its load free of the pallet or other support on which it was resting. Then the operator walks with the load to the newly desired location and manipulates the several valves, in a manner which will be understood from the foregoing description, to raise or lower the load as may be desired. The short trigger 70 is then pressed to release the load and the clamping device is withdrawn.

It is to be noted that the lines 53, 56 and 59 are shown in dotted lines in Fig. 2 somewhat displaced from the positions which they occupy with relation to the bed or frame 18 in actual practice, as is more correctly shown in Figs. 1 and 3. This distorted showing in Fig. 2 is made in order better to illustrate the several connections of the lines to each other and to their respective fittings, much of which would be obscured if the lines were shown compactly collected in their true arrangement on the surface of the bed or frame 18. Most or all of the lines may be and preferably are made of high pressure flexible rubber hose slipped and clamped over their fittings, as is conventional in pressure systems of this kind.

An important feature of the invention is the pivotal relation of the pin 16 and bearing 11 by which the load may be swung through approximately 90° between the time it is picked up and the time it is released, so that blocks may be picked up from sidewise position and set down upright, or vice versa. It will be seen from Fig. 3 that pin 16 is held in the bearing 11 in any suitable way, as by a washer 72 and cotter pin 73.

The arms 19 and 20 are substantially alike. Each is provided with an abutment for limiting the penetration of the arms between the blocks of a row. However, since in the illustrated embodiment only the arm 20 moves relatively to the bed 18, I prefer to make the forward edge of its abutment 74 curved about the center of the fulcrum 23, since this edge moves with relation to and in contact with the adjacent block when the arm is swung. The abutment 75 of the fixed arm 19 may be provided with a flat shoulder as shown in Fig. 1.

Figure 10:
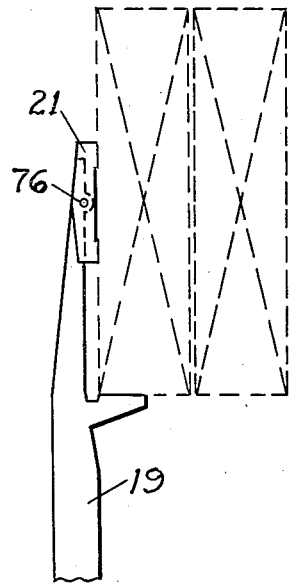

In order to adapt the arms to use with a wide range of different sizes of blocks, I prefer to use interchangeable shoes. Fig. 10 shows a shoe 21, like that shown in Fig. 1, which is pivoted on the rear end portion of each of the arms 19 and 20 by a pin 76. The shoe is thus self setting against block surfaces that may be irregular or warped. A shoe of the small size of the shoe 21 is appropriate for handling long blocks such as large tile, concrete and cinder blocks and the like.

Figure 9:
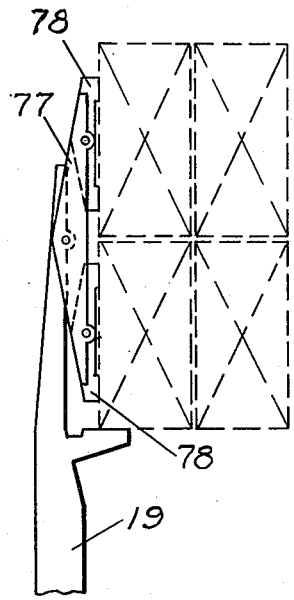

For blocks of somewhat smaller size the shoe 21 is removed and an adapter, shown at 77 in Fig. 9 is substituted. This adapter has pin-connected to it a pair of shoes 78, each of which bears against an adjacent smaller block, so that two rows of such smaller blocks can be handled.

Figure 7:
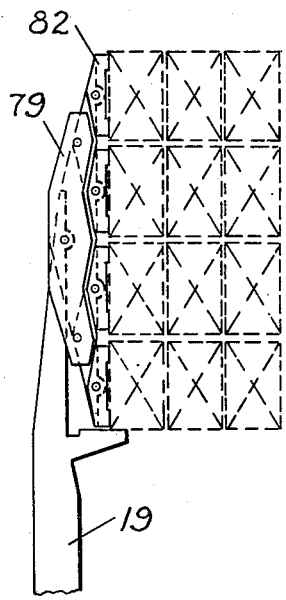
Figs. 7, 8, 9 and 10 are plan views of one of the clamping jaws showing different shoes engaged therewith and the manner in which they grip building blocks or other units of different size.
Figure 8:
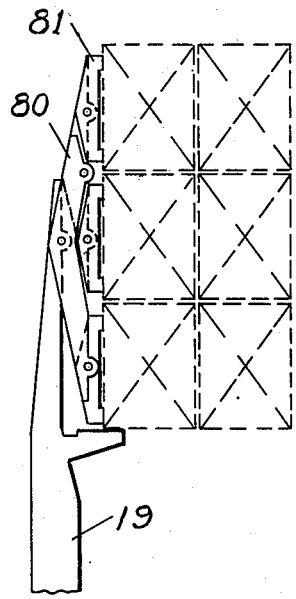

Similarly, when still smaller blocks are to be handled, as in Figs. 7 and 8, other adapters 79 and 80 may be substituted for the shoe 21 and may in turn have mounted on them three, four, or even more shoes 81, 82. In this way the machine is readily converted for the handling of units throughout the whole range between the largest concrete blocks or tiles down to the smallest bricks or the like.

It is believed that the structure, uses and advantages of the machine will, from the foregoing description of a preferred embodiment, be sufficiently clear to those skilled in the art. It is to be understood that the mechanical details are subject to variation and differences of design and arrangement, and that not all of the several features need be used in the particular combinations and relations shown.

I claim:

1. A block handling machine comprising a frame member, relatively movable clamping jaws mounted on the frame member, means for actuating said jaws to clamp or release a load of blocks or the like, an elevating and lowering member, a substantially horizontal socket element mounted parallel to the jaws on the lower portion of the elevating and lowering member, and a substantially horizontal pin element mounted parallel to the jaws on the frame member and received in the socket element for rotation therein to swing the frame member about a substantially horizontal axis whereby the plane containing the jaws may be adjusted from a horizontal to a vertical position.

2. A block handling machine comprising an elevating and lowering member having a substantially horizontally disposed socket in its lower portion, a frame member having a pivot pin rearwardly projecting from substantially its center and received in said socket for rotation therein, a pair of cooperating clamping jaws extending rearwardly from opposite ends of the frame member, at least one of said jaws being fulcrumed on the frame member, and means mounted on the front of the frame member for expanding the front ends of said jaws so as to move the rear ends thereof into clamping relation with an interposed load.

3. A block handling machine comprising a frame member having along its front side a fluid pressure operated cylinder and piston, a rod connected to the piston, clamping jaws mounted on the frame member and having their rear ends projecting rearwardly from the frame member and their front ends connected to said piston rod and cylinder respectively, at least one of said jaws being fulcrumed on the frame member whereby relative movement of the cylinder and piston will move the jaws to clamping or releasing positions with respect to an interposed load, an elevating and lowering member and means for moving the same upwardly and downwardly, interconnected pivot elements mounted respectively on the elevating and lowering member and on the rear of the frame member in substantially the plane of the clamping jaws, and manually operable valve means mounted on the frame member at each opposite end portion thereof for controlling a supply of fluid under pressure to the cylinder and adapted to serve as handles by which the frame member may be grasped from the front and manually rotated about the axis of the pivot elements.

4. A block handling machine comprising a frame member having along one side a fluid pressure operated cylinder and piston, a rod connected to the piston, clamping jaws mounted on the frame member and having one end of each projecting from the frame member and the other end of each connected to said piston rod and cylinder respectively, at least one of said jaws being fulcrumed on the frame member whereby relative movement of the cylinder and piston will move the jaws to clamping or releasing positions with respect to an interposed load, an elevating and lowering member and means for moving the same upwardly and downwardly, interconnected pivot elements mounted respectively on the elevating and lowering member and on the frame member in substantially the plane of the clamping jaws, and manually operable valve means mounted on the frame member at each opposite end portion thereof for controlling a supply of fluid under pressure to the cylinder and adapted to serve as handles by which the frame member may be manually grasped and rotated about the axis of the pivot elements.

5. A block handling machine as claimed in claim 2, including fluid pressure means for operating the elevating and lowering member, other fluid pressure means for operating the jaws, and manually operable valve means positioned at opposite ends of the frame member for controlling both of said fluid pressure means.

6. A block handling machine comprising cylinder and piston rod elements, means hanging one of said elements vertically from a support, a pivot member mounted substantially horizontally on the lower end of the other of said elements, a frame member having a pivot member rigidly mounted on the frame and extending substantially horizontally from approximately the transverse middle thereof cooperating with the first named pivot member whereby the frame member may be swung about a substantially horizontal axis, cooperating jaws mounted on the frame member substantially parallel to the axis of the pivot members and movable into and out of clamping relation with an interposed load, cylinder and piston rod elements mounted on the frame member for actuating said jaws, and manually operable valve means mounted on the frame member for controlling a supply of fluid under pressure independently to each of said cylinder elements.

7. A block handling machine comprising a cylinder, a piston rod cooperating with the cylinder and hung vertically from a support, a pivot member mounted substantially horizontally in the lower end of the cylinder, a frame member having a pivot member rigidly mounted on the frame and extending substantially horizontally from approximately the transverse middle thereof cooperating with the first named pivot member whereby the frame member may be swung about a substantially horizontal axis, cooperating jaws mounted on the frame member substantially parallel to the axis of the pivot members and movable into and out of clamping relation with an interposed load, cylinder and piston rod elements mounted on the frame member for actuating said jaws, and manually operable valve means mounted on the frame member for controlling a supply of fluid under pressure independently to each of said cylinder and cylinder elements.

8. A block handling machine comprising a frame member, relatively movable clamping jaws mounted on the frame member, pneumatic means for actuating said jaws to clamp or release a load of blocks or the like, other pneumatic means for moving the frame member vertically, pivot means rigidly formed on the frame member, extending substantially horizontally from approximately the transverse middle thereof, and mounting the frame member for manual rocking movement between positions in which the jaws are in side by side horizontally spaced relation and are in vertically superposed relation, and valve means mounted at the opposite end portions of the frame member for controlling the pneumatic means and for serving as handles by which the frame member may be grasped and rocked between said positions, the valve means at one end portion of the frame member controlling movement of the jaws to clamping position and movement of the frame member in one vertical direction, and the valve means at the opposite end portion of the frame member controlling movement of the jaws to releasing position and movement of the frame member in the opposite vertical direction.

9. A block handling machine comprising a frame member, relatively movable clamping jaws mounted on the frame member and projecting rearwardly therefrom, cylinder and piston rod elements mounted on the frame member for actuating said jaws to clamp or release a load of blocks or the like, an elevating and lowering member including a cylinder and a piston rod cooperating with the cylinder and hung vertically from a support, interfitted substantially horizontal pivot pin and socket elements projecting from said members respectively whereby the frame member may be rotated about a substantially horizontal axis to turn the jaws between side by side and vertically superposed relations, manually operable valve means mounted at one end of the frame member for controlling a supply of fluid under pressure to each of said cylinder and cylinder elements, and manually operable valve means mounted at the other end of the frame member for exhausting fluid under pressure from each of said cylinder and cylinder elements.

MILLARD R. WARREN.

REFERENCES CITED

The following references are of record in the file of this patent:

UNITED STATES PATENTS

| Number | Name | Date |
| --- | --- | --- |
| 619,834 | Nickerson | Feb. 21, 1899 |
| 820,946 | Balzer | May 22, 1906 |
| 1,010,501 | Jones | Dec. 5, 1911 |
| 1,302,861 | Schott | May 6, 1919 |
| 1,427,469 | Hoefflinger | Aug. 29, 1922 |
| 1,490,235 | Smith et al. | Apr. 15, 1924 |
| 1,724,304 | Newman | Aug. 13, 1929 |
| 1,878,994 | Abbe | Sept. 27, 1932 |
| 2,375,045 | Sloane | May 1, 1945 |